June 4, 1929.  L. C. WILDERMAN  1,716,288
PROCESS FOR CLEANING GEAR CASES AND THEIR CONTENTS
Filed April 8, 1927
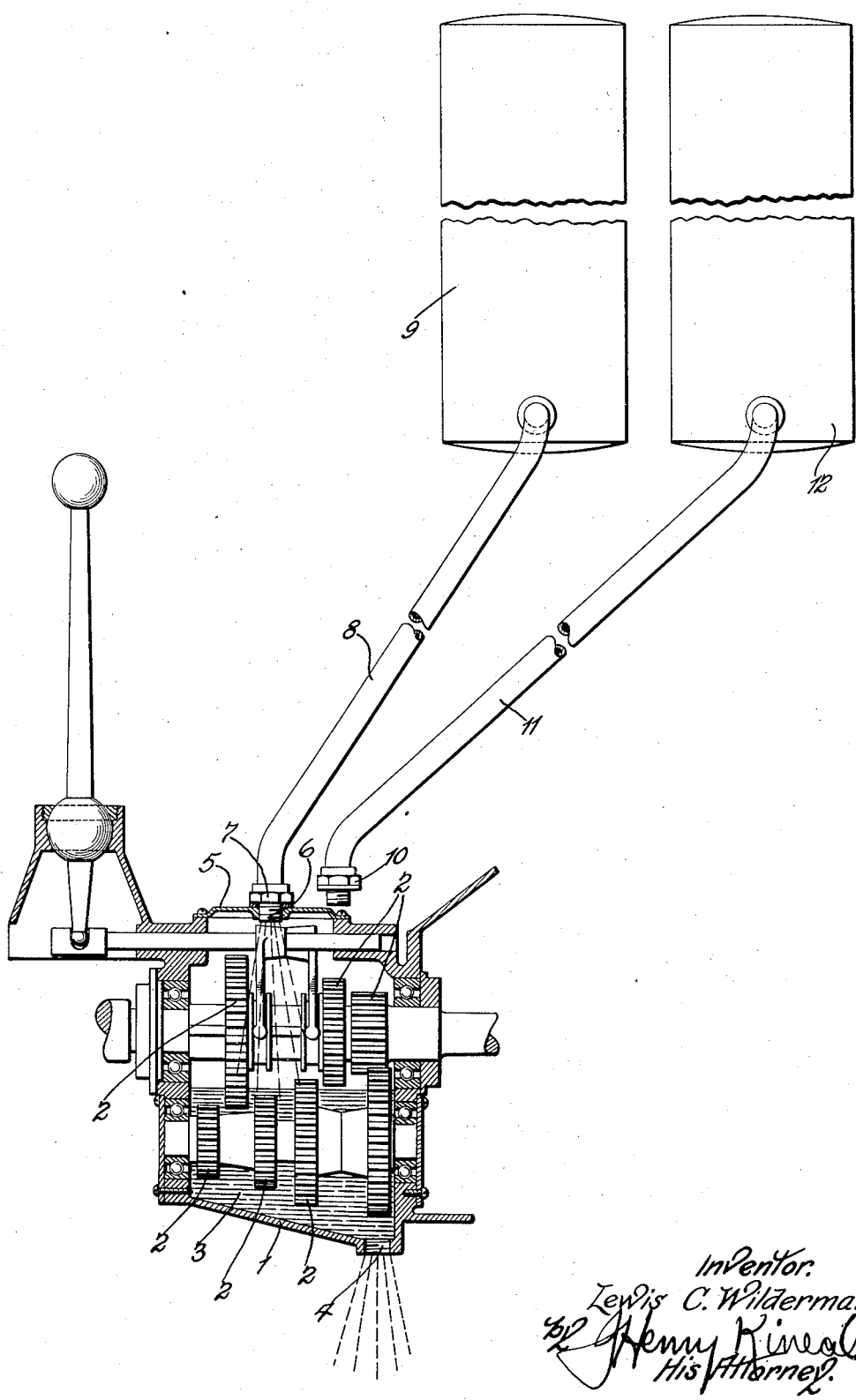

Patented June 4, 1929.

1,716,288

UNITED STATES PATENT OFFICE.

LEWIS C. WILDERMAN, OF ST. LOUIS, MISSOURI.

PROCESS FOR CLEANING GEAR CASES AND THEIR CONTENTS.

Application filed April 8, 1927. Serial No. 182,076.

My invention relates to processes for cleaning gear cases and more particularly processes for cleaning gear cases such as are used on automobiles to house the different units for the transmission of power from the motor to the wheels and which have a plurality of moving parts mounted therein.

Heretofore, many expedients have been attempted in an effort to remove the old lubricant from the gear cases of automobiles, but it has, heretofore, been impossible to adequately clean the case in a manner which will not injure the bearings on which the gears are mounted and which will at the same time remove all of the old lubricant. Often, especially in winter, the body of old lubricant becomes hard and the gears cut channels in the lubricant in which they rotate and the lubricant is not distributed to the bearings and, consequently, the bearings with this insufficiency of lubrication often are injured. Also, the lubricant becomes polluted by dirt and other foreign objects, which find their way into the case, and loses its efficiency, so that it is best to remove all the old lubricant from the case and replace it with a fresh supply.

The object of my invention is to provide a process in the practice of which a body of lubricant may be quickly and easily flushed from the gear case, and the gear case may be thoroughly cleaned before new lubricant is placed therein.

The different parts used in the practice of my invention to clean an automobile transmission gear case are somewhat diagrammatically shown in the accompanying drawing wherein similar characters are used to designate similar parts.

Referring to the drawing one practice of my process to clean such a gear case is as follows:—When it is desired to clean the gear case 1 and the gears 2 mounted therein and to remove the body of lubricant 3 from the gear case, a plug, not shown, is removed from the drain 4. The top of the gear case is usually provided with a removable inspection plate 5 which has in about the middle thereof an inlet 6 through which lubricant is poured into the gear case after a plug, not shown, which normally closes this inlet is removed therefrom.

My new and improved process in its broadest practice consists in injecting steam through the inlet 6 to heat the body of the lubricant 3 whereby it will be reduced to a fluid state and will then flow out through the drain 4. In order to remove the water caused by condensation of steam in the case I prefer to inject therein air under pressure. This air will sweep over the parts and remove the water therefrom and more particularly from between the bearings and surface which move in contact with them so that they will not freeze together to make it impossible or difficult to move the parts. Any suitable drying agent, however, could be substituted for air under pressure.

If the body of lubricant 3 is very hard the steam injected into the gear case will merely melt the upper surface of the lubricant and this upper surface will act as an insulation to prevent the heat of the steam from penetrating very far into the body of lubricant to melt it enough to cause it to to flow out of the drain 4. When this condition exists the discharge nozzle 7 of the conduit 8 leading from a source of steam supply indicated diagrammatically at 9 is loosely positioned in the inlet 6 of the gear case and steam is injected into the case. During the injection of steam a stick, wire or short length of tubing is thrust upwardly through the drain 4 and through the body of lubricant 3 whereby when it is withdrawn a passage will be formed through the body of the lubricant to the drain. The steam injected into the case will flow through this passage and heat the body of lubricant adjacent thereto so that the passage will be enlarged and the melted lubricant will pass out through the drain 4. As the injection of steam is continued the passage will get larger and larger until finally substantially all of the body of lubricant 3 will have been flushed out of the gear case through the drain. Then, to more thoroughly clean the gear case the threaded nozzle 7 is screwed into the inlet 6 so as to make a substantially airtight joint therewith and steam is again injected into the case.

Of course, when the nozzle is loosely held over the inlet 6 to inject steam into the gear case the steam will be at substantially atmospheric pressure and the temperature thereof will be very little higher than 212 degrees Fahrenheit. However, when an airtight connection is made between the nozzle 7 and the inlet 6 the steam pressure will be that of the pressure in the source of supply 9 and therefore will be above atmospheric pressure with a resultant increase of temperature of the steam so that any lubricant adhering to the gears 2 or other parts in the interior of the gear case 1 will be melted and flushed out through the drain 4 with the escaping steam and water and the interior of the gear case and its contents will be thoroughly cleaned. Then, the injection of steam is stopped, the nozzle 7 is turned out of the inlet 6 and the nozzle 10 on the outer end of the conduit 11 leading from a source of supply of air under pressure, diagrammatically shown at 12, is screwed into the inlet 6 so as to make a substantially airtight joint therewith and air under pressure is injected into the case. As this air escapes through the drain 4 it will carry with it any water caused by the condensation of steam, and the contents of the gear case will be thoroughly dried.

After the case has been cleaned, the drain plug is positioned to close the drain 4, and a new lubricant is put into the case through the inlet 6, and the inlet is then closed by a plug.

It will be understood that my improved process may be applied to other types of gear cases, and having inlet and outlet openings otherwise disposed, than that shown; as, for example, to the differential housing of an automobile.

What I claim as new and desire to secure by Letters Patent, is:—

1. A process for cleaning a gear case and its contents which comprises opening a drain in said case, injecting steam into said case, continuing the injection of steam until the case is clean and then injecting air under pressure into said case to remove the water caused by the condensation of steam therein.

2. A process for cleaning a gear case and its contained gears, which comprises opening a drain in said case, injecting steam at another point into said case and causing it to be discharged through said drain, continuing the injection of steam until the case is clean, and then injecting a drying agent into said case to remove the moisture caused by the condensation of steam therein.

3. A process for cleaning a gear case and its contained gears, which comprises opening a drain in said case, injecting steam at another point into the case and causing it to be discharged through said drain, continuing the injection of steam until the case is clean, and then injecting air under pressure into said case to remove the moisture caused by the condensation of steam therein.

4. A process for removing hardened or congealed lubricant from a gear case, which consists in opening a drain in said gear case, melting the lubricant and flushing it out through said drain by injecting steam into the gear case through another opening therein, continuing the injection of steam until the case is clean, and then injecting a drying agent into said case to remove the moisture caused by the condensation of steam therein.

5. A process for removing hardened lubricant from a gear case and its contained gears, which comprises opening a drain in said case, injecting steam into the case, forming a passage through the body of lubricant from the zone of application of the steam thereto to said drain, and continuing the injection of steam until the lubricant has been melted and flushed from the case through said drain.

6. A process for removing hardened lubricant from a gear case and its contained gears, which comprises opening a drain in said case, injecting steam into the case, forming a passage through the body of lubricant from the zone of application of the steam thereto to said drain, continuing the injection of steam until the lubricant has been melted and flushed from the case through said drain, and injecting air under pressure into said case to remove the moisture caused by the condensation of steam therein.

7. A process for cleaning a gear case and its contained gears which comprises opening a drain at the bottom of said case, opening an inlet above the body of lubricant in said case, loosely positioning in said inlet the discharge end of a conduit from a source of steam supply to inject steam into said case and causing said steam to flow out through said drain, continuing the injection of steam until the body of lubricant has passed from said case through said drain, and then making a substantially airtight connection between the discharge end of said conduit and said inlet and again injecting steam into said case.

8. A process for cleaning a gear case and its contained gears which comprises opening a drain at the bottom of said case, opening an inlet above the body of lubricant in said case, loosely positioning in said inlet the discharge end of a conduit from a source of steam supply to inject steam into said case, continuing the injection of steam until the body of lubricant has passed from said case through said drain, making a substantially airtight connection between the discharge end of said conduit and said inlet and again injecting steam into said case, and then injecting air under pressure into said case to remove the water caused by the condensation of steam therein.

9. A process for cleaning a gear case and its contained gears which comprises opening a drain at the bottom of said case, opening an inlet above the body of lubricant in said case, loosely positioning in said inlet the discharge end of a conduit from a source of steam supply to inject steam into said case, forming a passage through said body of lubricant from the zone of application of the steam thereto to said drain, continuing the injection of steam until the body of lubricant has passed from said case through said drain, making a substantially airtight connection between the discharge end of said conduit and said inlet and then again injecting steam into said case.

10. A process for cleaning a gear case and its contained gears which comprises opening a drain at the bottom of said case, opening an inlet above the body of lubricant in said case, loosely positioning in said inlet the discharge end of a conduit from a source of steam supply to inject steam into said case, forming a passage through said body of lubricant from the zone of application of the steam thereto to said drain, continuing the injection of steam until the body of lubricant has passed from said case through said drain, making a substantially airtight connection between the discharge end of said conduit and said inlet and again injecting steam into said case, and then injecting air under pressure into said case through said inlet to remove the water caused by the condensation of steam therein.

In witness whereof I have signed my name to the foregoing specification.

LEWIS C. WILDERMAN.